United States Patent [19]

Kraus

[11] 4,408,502

[45] Oct. 11, 1983

[54] TRACTION ROLLER TRANSMISSION

[75] Inventor: Charles E. Kraus, Austin, Tex.

[73] Assignee: Excelermatic Inc., Austin, Tex.

[21] Appl. No.: 242,361

[22] Filed: Mar. 10, 1981

[51] Int. Cl.$^3$ .............................................. F16H 3/44
[52] U.S. Cl. ...................................... 74/789; 74/190; 74/211; 74/796; 74/798
[58] Field of Search ................. 74/690, 789, 796, 798, 74/804, 805, 721, 190, 199, 200, 201, 211

[56] References Cited

U.S. PATENT DOCUMENTS

| | | | |
|---|---|---|---|
| 1,035,155 | 8/1912 | Clark | 74/190 |
| 2,241,013 | 5/1941 | Gay | 74/190 |
| 2,815,685 | 12/1957 | Parrett | 74/798 |
| 3,160,031 | 12/1964 | Bugg | 74/798 |
| 3,945,270 | 3/1976 | Nelson et al. | 74/798 |

Primary Examiner—Leslie A. Braun
Assistant Examiner—Joseph M. Rolnicki
Attorney, Agent, or Firm—Klaus Bach

[57] ABSTRACT

A planetary type traction roller transmission includes first and second sun roller structures and traction rings with first and second motion transmitting traction rollers disposed in the annular spaces between, respectively, the first and second sun roller structures and traction rings. The axis of the sun roller structures is spaced from the axis of the traction ring so that an annular space of varying width is formed between the sun roller structures and the respective traction rings and the first and second traction rollers are supported in the respective annular spaces by support means permitting movement of one, either the first or second traction rollers, into a narrowing area of respective annular space while the others are moved into a widening area of their respective annular space for engagement of the one set of traction rollers with, and disengagement of the other set of traction rollers from, the respective traction rings and sun roller structures.

12 Claims, 4 Drawing Figures

TRACTION ROLLER TRANSMISSION

BACKGROUND OF THE INVENTION

The invention relates to a planetary type traction roller transmission whose transmission ratio is variable between two predetermined values.

A planetary type traction roller transmission consists of a traction ring having a sun roller disposed therein and planetary rollers arranged in the annular space between, and in firm engagement with, the sun roller and the traction ring for the transmission of motion between the sun roller and the traction ring. The sun roller is so arranged that its axis is parallel to, but spaced from, the axis of the traction ring such that an annular space of varying width is formed between the sun roller and the traction ring and the traction rollers are so arranged in this annular space that at least one of them is pulled by reaction forces into a narrowing section of the annular space when a torque is transmitted thereby causing firm frictional engagement of the traction rollers with the sun roller and the traction ring.

While such transmissions are efficient, quiet running and quite inexpensive to manufacture, they provide only for one transmission ratio. The use of two such transmissions with different transmission ratios and clutches permitting engagement of a desired one of the transmission's would render such transmission substantially more expensive such that they may not be competitive with gear shift transmissions.

For certain applications, however, it would be desirable to provide a simple and inexpensive traction roller transmission with at least two different transmission ratios such that a machine equipped with such a transmission can be operated in two different speed ranges.

SUMMARY OF THE INVENTION

In a planetary type traction roller transmission, first and second sun roller structures are rotatably supported within first and second traction rings with their axes arranged in spaced parallel relationship such that an annular space of varying width is formed between the sun roller structures and the respective traction rings. First and second sets of traction rollers are disposed in the space between, and for engagement with, the respective first and second sun roller structures and traction rings to transmit motion therebetween. The traction rollers are so supported that only one of said first and said second traction rollers is placed into engagement with the respective sun roller structure and traction ring while the other is disengaged from the respective sun roller structure and traction ring and means are provided for changing over between engagement of the one to engagement of the other of the traction rollers. The diameter ratio of the first sun roller structure to the first traction ring is different from the diameter ratio of the second sun roller structure to the second traction ring such that the transmission ratio of the traction roller transmission is changed upon such change-over.

This arrangement provides for a simple inexpensive traction roller transmission which has two or possibly more transmission ratios available for the transmission of motion.

DESCRIPTION OF THE PREFERRED EMBODIMENT

Figure 2:
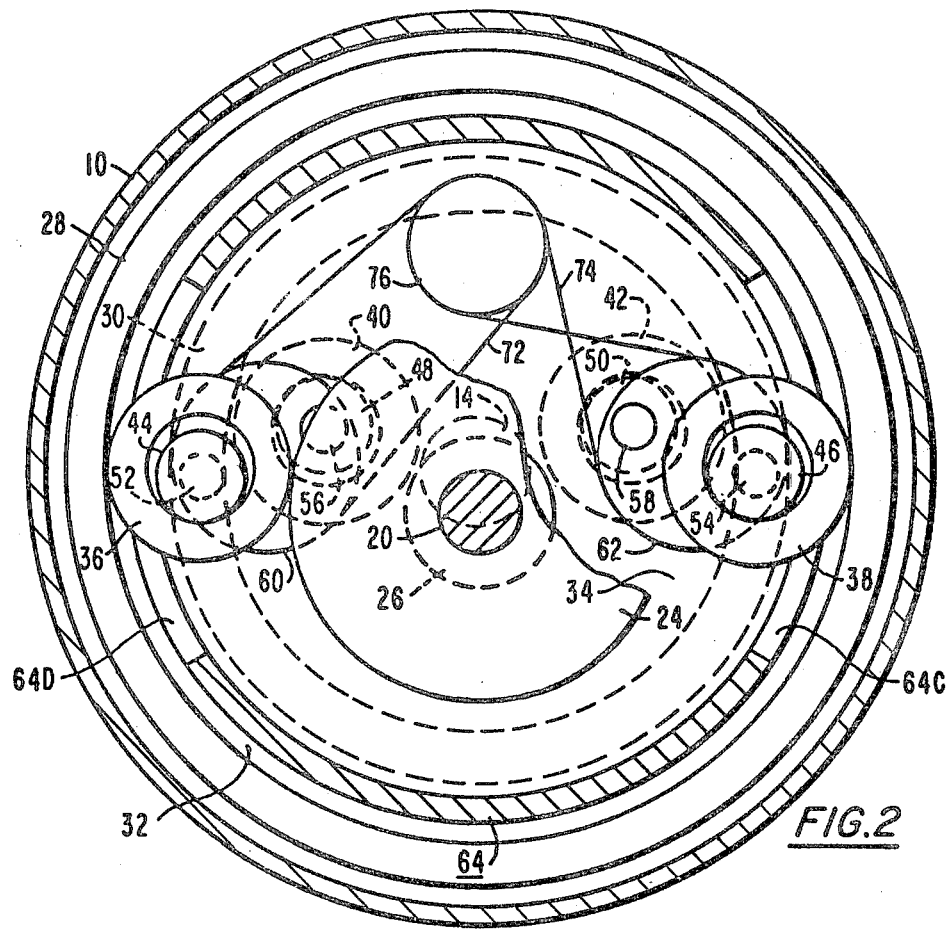
FIG. 2 is a schematic cross-sectional view taken along line II—II of FIG. 1 and showing in principle the speed changing arrangement.
Figure 1:
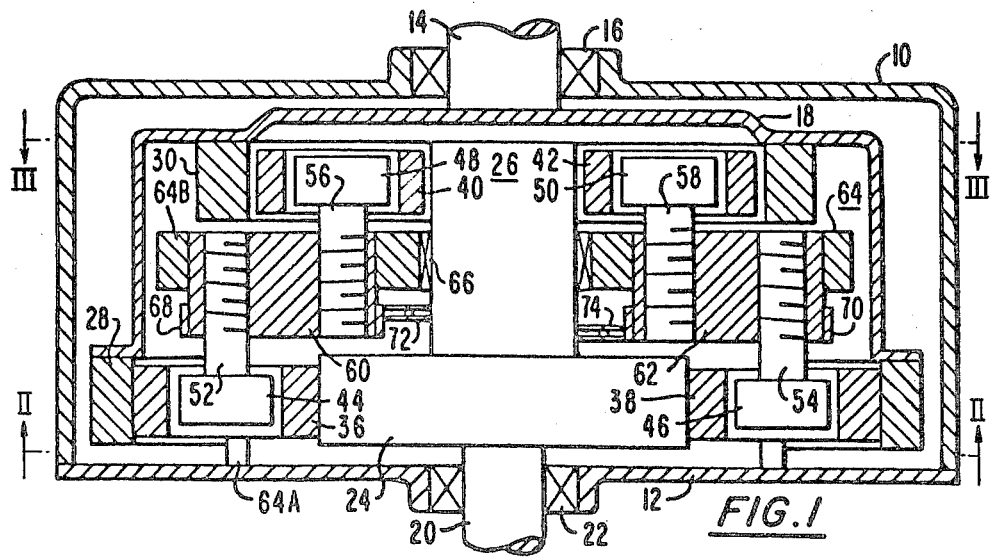
FIG. 1 shows, in axial cross-section, a planetary type two speed traction roller transmission according to the present invention.
Figure 2:
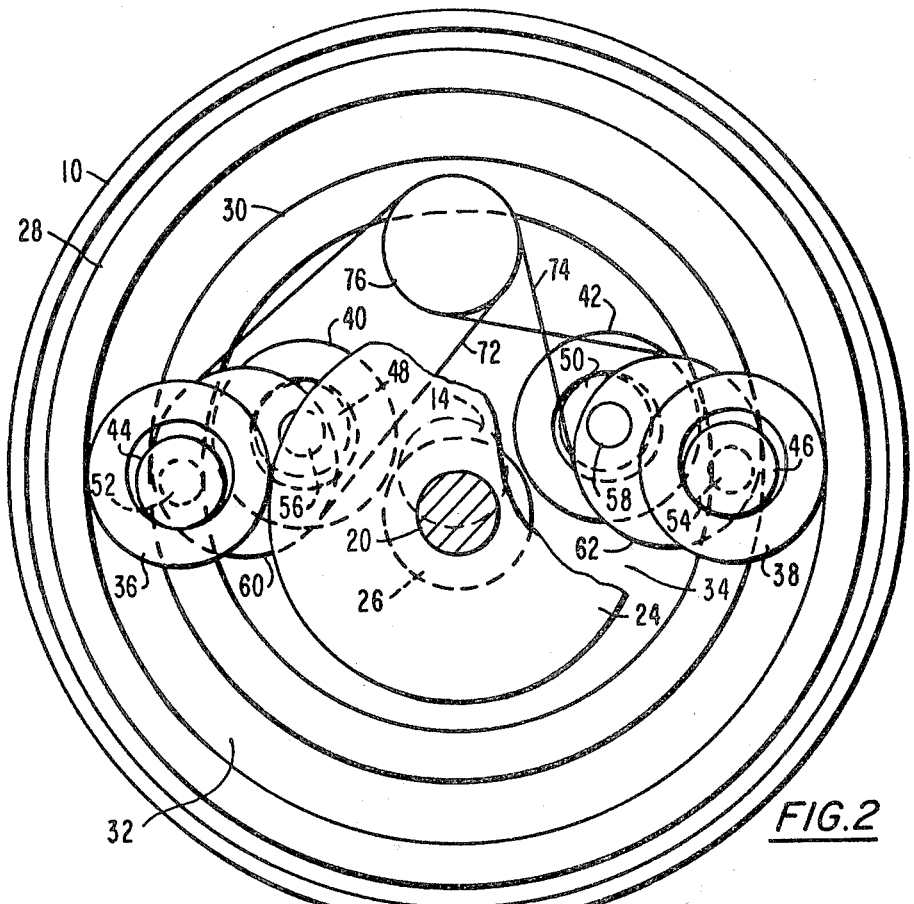
Figure 1:
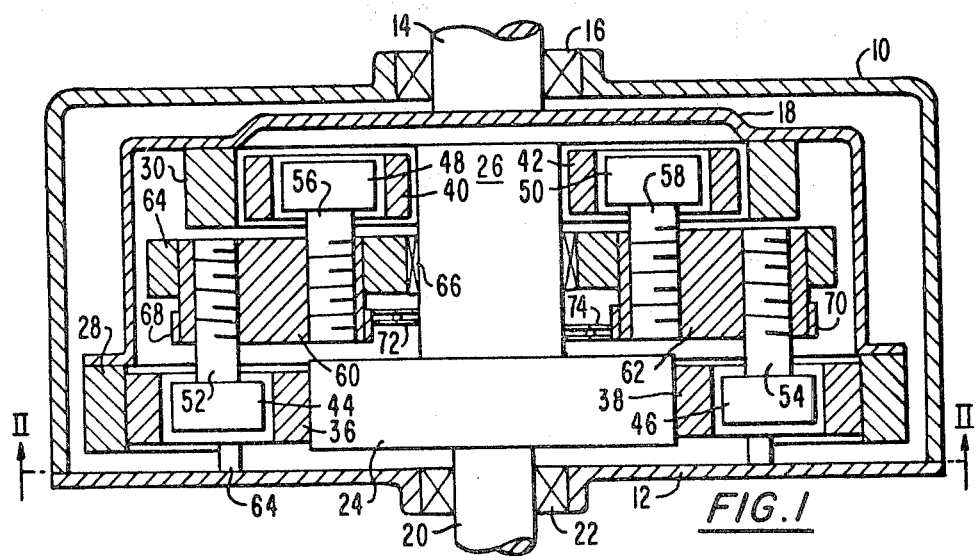
Figure 3:
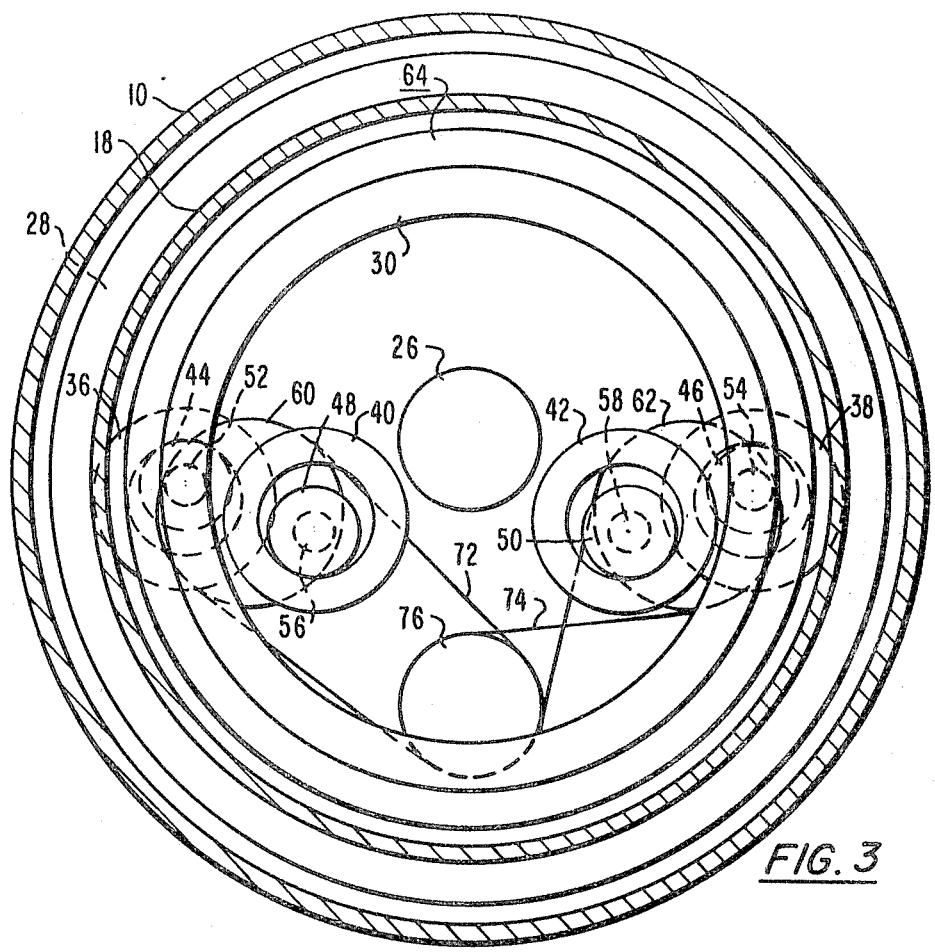
FIG. 3 is a cross-sectional view taken along lines III—III of FIG. 1.
Figure 4:
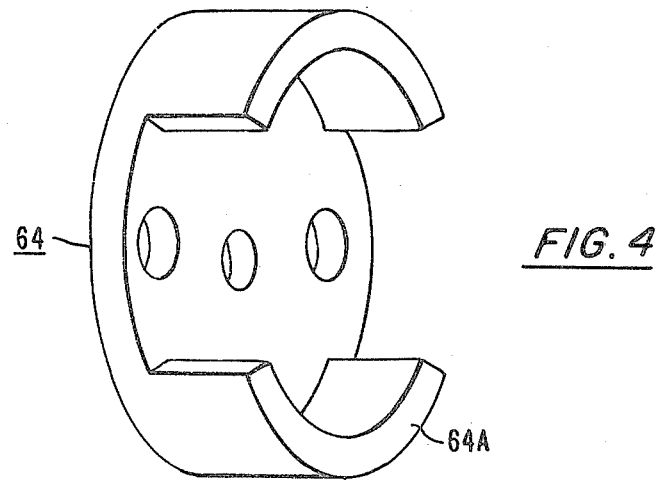
FIG. 4 is a perspective view of the interior housing portion supporting the traction rollers.

As shown in FIG. 1 the transmission is disposed in a housing bell 10 provided with a housing cover 12. A slow speed shaft 14 is rotatably supported in the housing bell 10 by bearings 16 and a drive bell 18 is connected thereto so as to be rotatably supported within the housing bell 10. A high speed shaft 20 is rotatably supported on the housing cover 12 by bearings 22 and carries within the housing bell 10 a first sun roller structure 24 and a second sun roller structure 26 axially spaced from the first sun roller structure 24. The drive bell 18 includes a first traction ring 28 arranged in a radial plane around the first sun roller structure 24 and a second traction ring 30 arranged in a plane around the second sun roller structure 26. As shown in FIG. 2 the high speed shaft 20 is disposed in parallel axial alignment with the low speed shaft 14 but in spaced relationship therefrom by a distance such that annular spaces 32 and 34 of varying width are formed between the first sun roller structure 24 and traction ring 28 and between the second sun roller structure 26 and traction ring 30.

First motion transmitting traction rollers 36, 38 are disposed in the annular space 32 between the first sun roller structure 24 and the first traction ring 28 and in engagement therewith for the transmission of motion therebetween and second motion transmitting traction rollers 40, 42 are disposed in the annular space 34 between the second sun roller structure 26 and the second traction ring 30 and in engagement therewith for the transmission of motion between the second sun roller structure 26 and the traction ring 30. The traction rollers 36, 38 and 40, 42 are held in position by cam followers 44, 46 and 48, 50 mounted on bolts 52, 54 and bolts 56, 58 respectively, which bolts are eccentrically supported by control discs 60 and 62. The control discs 60 and 62 are rotatably supported in a housing portion 64 extending from the housing cover 12 into the drive bell 18 and supporting therein also the sun roller structure 26 by means of a bearing 66. The housing portion 64 is an annular structure projecting from the housing cover 12 at 64A and extending into the drive bell 18 having its inner end, a support wall 64B, in which the control discs 60 and 62 are rotatably supported. The annular structure has cut-out areas 64D and 64C for accommodation of the rollers 36 and 38 respectively. The control discs 60 and 62 are provided with chain sproket gears 68, 70 and are operatively connected by chains 72, 74 or other transmission means to a control disc operating mechanism 76 (FIG. 2) for rotating the control discs 60 and 62 at the same time but in opposite directions. As shown in FIG. 2 the control disc operating mechanism is a sprocket wheel engaging the chains 72 and 74 which is mounted on an operating shaft extending through the housing cover 12 (behind the high speed shaft 20) as shown in FIG. 1.

OPERATION

If the transmission is used as a speed-up transmission, the slow speed shaft 14 is the input shaft, the output shaft 20 being operated at two different speed increasing output speed ratios depending on whether the first traction rollers 36, 38 or the second traction rollers 40, 42 are moved into engagement with the respective sun roller portions and traction rings. For the lower ratio speed transmission, the operating disc 76 is rotated counterclockwise as shown in FIG. 2 such that the control disc 60 is rotated counterclockwise while the control disc 62 is rotated clockwise and both first traction rollers 36 and 38 are moved into the narrowing area of the space 32 between the sun roller structure 24 and the traction ring 28 and into firm frictional engagement therewith. Motion is then transmitted from input shaft 14 to output shaft 20 at a ratio of $d_1:D_1$ wherein $d_1$ is the diameter of the first sun roller structure 24 and $D_1$ is the diameter of the first traction ring 28. If, as shown, $D_1=2d_1$ the transmission ratio is 1:2, that is, the output shaft speed is twice the input shaft speed.

For the higher ratio speed transmission, the operating disc 76 is rotated clockwise so that both first traction rollers 36 and 38 are moved out of engagement with the sun rollers structure 24 and the first traction ring 28 into a wider area of the space 32 while the second traction rollers 48 and 50 are moved into engagement with the second sun roller structure 26 and the second traction ring 30. Motion is then transmitted from the input shaft 14 to the output shaft 20 through the second traction rollers 48, 50 at a ratio of $d_2:D_2$ wherein $d_2$ is the diameter of the second sun roller structure 26 and $D_2$ is the diameter of the second traction ring 30. If as shown $D_2=4d_2$, the transmission ratio is 1:4, that is the output shaft speed is four times the input shaft speed.

Changeover between the two predetermined ratios is simply possible by rotating the operating disc 76 in either direction.

The arragement is very simple and inexpensive requiring only roller, ring and disc sturctures which are easily manufactured and, like all traction roller transmissions, the present transmission is insensitive to load peaks. The transmission is further quiet even at very high speeds, that is output shaft speeds of about 20,000 rpm. It is advantageous that the traction rollers which are not in use are disengaged and do not rotate. This reduces wear of the surfaces not used and also reduces noise.

The invention, however, is not limited to the arrangement as described with reference to the drawings. More than two different transmission ratios may be provided and the mechanism for switching over from one to another ratio may include other means, for example, a lever arrangement. Also, a housing is not necessary. A support frame would be appropriate for some applications or the transmissions may be disposed within a housing which includes also other mechanical components.

What I claim is:

1. A planetary type traction roller transmission comprising: input and output shafts; first and second traction ring structures supported by, and for rotation with, one of said input and output shafts; first and second sun roller structures associated with the other of said input and output shafts, said first and second sun roller structures being disposed within said first and second traction ring structures, respectively, with the axis of said first and second sun roller structures being in axially parallel alignment with, but spaced from, the axis of said traction ring structures such that annular spaces of varying width are formed between the first and second sun roller structures and, respectively, the first and second traction ring structures; planetary first and second traction rollers disposed in the annular spaces between said first and, respectively, second sun roller and traction ring structures; support means extending into said traction ring structure and supporting therein said first and said second traction rollers; and means for moving said first traction roller into a narrowing area of the annular space between said first sun roller and traction ring structures for firm frictional engagement therewith for the transmission of motion therebetween, and said second traction roller into a widening area of the annular space between said second sun roller and traction ring stuctures for disengagement therefrom, and, alternatively, for moving said first traction roller into a widening area of the space between the first and second sun roller and traction ring structure and said second traction roller into a narrowing area between said second sun roller and traction ring structure for engagement therewith and transmission of motion therebetween.

2. A traction roller transmission as claimed in claim 1, wherein said traction roller support means are pivot structures supporting said first and second traction rollers on opposite pivot arms to cause, upon pivoting, engagement of one of said first and second traction rollers with, and disengagement of the other of said first and second traction rollers from, the respective sun roller and traction ring structures.

3. A traction roller transmission as claimed in claim 2, wherein said first and second traction rollers are eccentrically supported on pivotal support discs.

4. A traction roller transmission as claimed in claim 3, wherein sets of first and second traction rollers are arranged at opposite sides of said sun roller structures and said pivotal support discs are operatively interconnected so as to cause, upon pivoting, movement of said first and second traction rollers concurrently in opposite directions.

5. A traction roller transmission as claimed in claim 4, wherein said pivotal support discs are arranged axially between said first and second sun roller and traction ring structures and said first and second traction rollers are disposed at opposite sides of said pivotal support discs.

6. A traction roller transmission as claimed in claim 4, wherein an operating disc is disposed in said annular space between said support discs and in radial alignment with said support discs, and coupling means are provided operatively engaging said support discs with said operating disc in such a manner that rotation of said operating disc causes pivoting of said support discs in opposite directions.

7. A traction roller transmission as claimed in claim 6, wherein said coupling means is a chain drive.

8. A traction roller transmission as claimed in claim 6, wherein said coupling means is a cable.

9. A traction roller transmission as claimed in claim 1, wherein said traction rings are supported by a support bell mounted on one of said input and output shafts, and one of said traction rings is smaller than the other, the smaller traction ring being mounted in the interior of said bell while the other traction ring is mounted on the rim of said bell.

10. A traction roller transmission as claimed in claim 9, wherein said sun roller structure includes roller sections of different diameters, the smaller of which is disposed in radial alignment with said smaller traction ring whereas the larger is disposed in radial alignment with the other traction ring.

11. A traction roller transmission as claimed in claim 10, wherein the diameter ratio of said smaller traction ring and sun roller section is larger than the diameter ratio of the larger traction ring and sun roller section.

12. A traction roller transmission as claimed in claim 11, wherein said support discs are supported by an annular support structure extending around said sun roller structure in an axial space between said traction rings and having portions extending axially through the annular area between the first sun roller section and traction ring and between the first traction rollers, said annular support structure carrying a bearing for supporting therein said sun roller structure.

* * * * *